D. E. Fenn,
Automatic Gate,
No. 15,881.                             Patented Oct. 14. 1856.
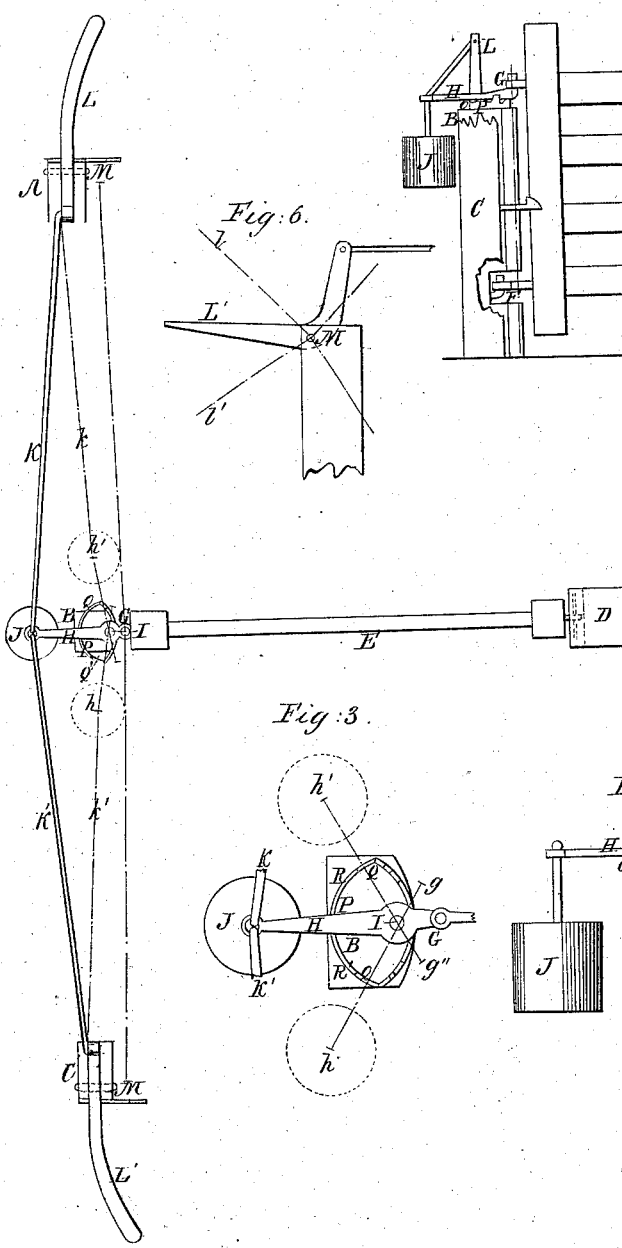
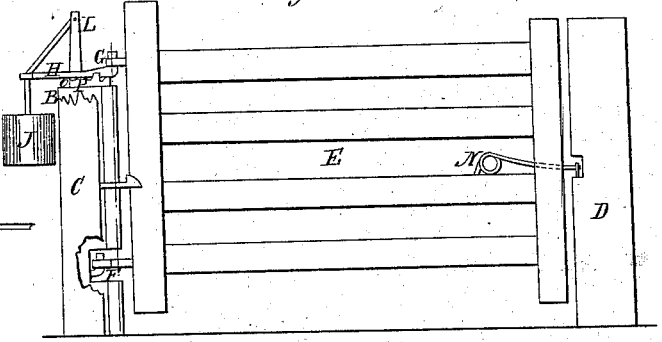
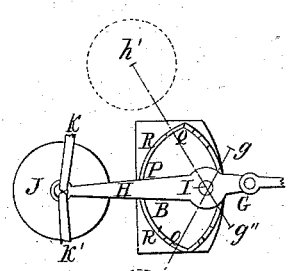
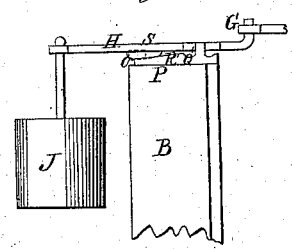
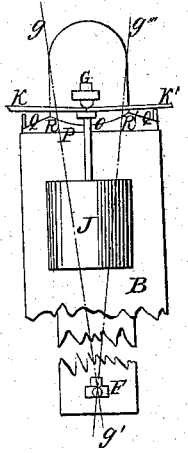

UNITED STATES PATENT OFFICE.

DENNIS E. FENN, OF TALLMADGE, OHIO.

METHOD OF OPENING AND CLOSING FARM-GATES.

Specification of Letters Patent No. 15,881, dated October 14, 1856.

*To all whom it may concern:*

Be it known that I, D. E. FENN, of Tallmadge, in the county of Summit and State of Ohio, have invented a new and Improved Gate; and I do hereby declare that the following is a full and exact description thereof, reference being had to the accompanying drawings, in which—

Figure 1 is a plan view of the gate; Fig. 2, a side view, and Figs. 3, 4, and 5, 6, detached sections enlarged, and which will be referred to in the description.

Like letters designate like parts in the several views.

A, B, C, D, represent the posts of the gate, which are secured in the ground, and may be connected if desirable, by suitable frame work so as to secure them together more permanently.

The gate E, which may be of any desirable form, is hung to the post B, by an ordinary hook, and eye, at F, and by a peculiarly arranged hook and eye at G. The arm H of the hook is connected to the post B by the pin I, Figs. 1 and 3, by this arrangement, the gate is hung to the post B. To the outer end of the arm, is hung the weight J, to keep the arm in place; to it is also connected the rods K, K'. These rods are also connected to the levers L, L', Fig. 1, and these levers are connected to the posts A and C, by the pin or bolt M, which passes through the posts and levers, and acts as a fulcrum for each lever, as seen in Figs. 1 and 6.

N is a spring latch attached to the gate, by which it is fastened in the catch, in the post D, when the gate is closed. To the top of the post B, is secured the cam P; this cam has a depression at O, as seen in Figs. 4 and 5, and a corresponding depression Q, Q', at the sides; between these depressions are elevations R, R'. These elevations and depressions form inclined planes, over which slides the arm H, and it is by the action of this cam, and the arm H, in connection with the rods and levers, that the gate is opened and closed.

By raising the lever L to *l*, as seen in Fig. 6, the lever I will move correspondingly. The gate E will then turn from D to C with sufficient force so that the spring latch in the gate will hook into the catch attached to the post C. By turning the lever from *l* to L, the gate may be closed, and by turning the lever L' to *l'*, the gate will swing from D to A, and will be held by the catch in the same way as at the post C. In turning the lever from L' to *l*, the lever L moves to *l'*.

The principle of operation is the same with both levers in opening and closing the gate, and the relative position of the rods K, K', with the levers in opening and closing the gate are indicated at *k, k'*. By this arrangement the gate may be opened toward, or from, the person opening it, as may be required, and in case a carriage is passing through may be opened by a person seated in it, and closed after the carriage has passed, by turning the levers, as before described. If preferable, the levers may be attached to the posts A, B, so as to stand horizontally, instead of vertically, as represented. When the gate is closed, by turning the lever L, to open it from you, the arms H and weight move from H to *h'*, and by opening the gate in a reverse direction, by either of the levers, the arm and weight will move to *h*. In opening the gate from D to A, the arm and weight in passing to *h*, Figs. 1 and 3, is raised up the incline R', Fig. 4, which raises the gate so that the latch N will be disconnected from the catch as soon as the gate is unlatched. In this way the arm descends into the depression Q'. This changes the center of gravity of the gate from G to *g*, at the same time the hinge F remains stationary. This gives the gate an inclination, as shown by the line *g, g'*, Fig. 5. This inclination causes the gate to swing to the post A, to regain its center of gravity. If the gate is opened from D to C, the arm and weight will turn to *h'*, and the hinge G will be at *g''* and the gate will then incline, or its center of gravity be changed to *g'''*, which will cause the gate to swing around to the post C. The gate may be opened and closed by hand, and the relative position of the hinges G and F, being such when the arm is in the position shown at H, that the gate will close by its own weight, in swinging around, to assume its center of gravity. In closing the gate, the principle of operation is the same as that described in opening. I contemplate connecting to the arm H, a friction roller, at S, which will enable the arm to slide upon the cam, with more facility.

I do not claim lifting the gate so as to unlatch it, by the same movement, or device, which causes it to swing open, as I am aware that such an arrangement is not new; but

What I claim as my invention and desire to secure by Letters Patent, is—

The cam P, with its alternate elevations and depressions, in combination with the arm H, and double-jointed hinge G, I, arranged and operating substantially as herein described.

DENNIS E. FENN.

Witnesses:
R. WHITTLESEY,
L. C. WALTON.